United States Patent
Bayona P. et al.

(10) Patent No.: US 9,434,138 B2
(45) Date of Patent: Sep. 6, 2016

(54) PEELABLE, NON-STICKY, HEAT-SEALABLE FILM FOR PACKAGING FATTY AND PASTY FOODS

(71) Applicant: Inteplast Group, Ltd., Livingston, NJ (US)

(72) Inventors: Rafael E. Bayona P., Morristown, TN (US); Gregory G. Gillis, Morristown, TN (US); Paul T. Alder, Lanoarie (CA)

(73) Assignee: Inteplast Group Corporation, Livingston, NJ (US)

( * ) Notice: Subject to any disclaimer, the term of this patent is extended or adjusted under 35 U.S.C. 154(b) by 290 days.

(21) Appl. No.: 14/257,367

(22) Filed: Apr. 21, 2014

(65) Prior Publication Data

US 2015/0298435 A1    Oct. 22, 2015

(51) Int. Cl.
| | | |
|---|---|---|
| *B32B 27/08* | (2006.01) | |
| *B32B 27/32* | (2006.01) | |
| *B32B 27/18* | (2006.01) | |
| *B32B 7/06* | (2006.01) | |
| *B32B 27/30* | (2006.01) | |

(52) U.S. Cl.
CPC .............. *B32B 27/08* (2013.01); *B32B 7/06* (2013.01); *B32B 27/18* (2013.01); *B32B 27/308* (2013.01); *B32B 27/32* (2013.01); *B32B 2250/242* (2013.01); *B32B 2270/00* (2013.01); *B32B 2307/30* (2013.01); *B32B 2307/31* (2013.01); *B32B 2307/408* (2013.01); *B32B 2307/518* (2013.01); *B32B 2307/7244* (2013.01); *B32B 2307/748* (2013.01); *B32B 2439/70* (2013.01)

(58) Field of Classification Search
CPC .................... B32B 2250/242; B32B 2270/00; B32B 2307/30; B32B 2307/31; B32B 2307/408; B32B 2307/518; B32B 2307/7244; B32B 2307/748; B32B 2439/70; B32B 27/08; B32B 27/18; B32B 27/308; B32B 27/32; B32B 7/06
USPC ........................................................ 428/212
See application file for complete search history.

(56) References Cited

U.S. PATENT DOCUMENTS

| | | | | |
|---|---|---|---|---|
| 4,996,096 | A * | 2/1991 | Dew ....................... | B32B 27/32 264/176.1 |
| 5,492,757 | A * | 2/1996 | Schuhmann ............. | B32B 27/32 428/317.9 |
| H001727 | H | 5/1998 | Jones et al. | |
| 5,773,136 | A | 6/1998 | Alder et al. | |
| 6,022,612 | A | 2/2000 | Wilkie | |
| 7,316,848 | B2 | 1/2008 | Longmoore | |
| 2003/0215555 | A1 | 11/2003 | Leigner et al. | |
| 2007/0179230 | A1 | 8/2007 | Sperlich et al. | |
| 2010/0009208 | A1* | 1/2010 | Lee ........................ | B32B 9/04 428/483 |

FOREIGN PATENT DOCUMENTS

EP    1810823  A1    7/2007

* cited by examiner

*Primary Examiner* — Bijan Ahvazi
*Assistant Examiner* — Lawrence Ferguson
(74) *Attorney, Agent, or Firm* — Senniger Powers LLP

(57) ABSTRACT

A heat-sealable polymer-based multilayer film for peelably and releasably packaging pasty or fatty foods comprising a polymer-based core layer having a food-facing side and an exterior-facing side, a peelable layer on the food-facing side of the core layer, the peelable layer having a food-facing side and a core-facing side, and the peelable layer containing a peeling agent, and an interior skin layer on the food-facing side of the peelable layer, the interior skin layer having a food-facing side and a core-facing side. The core layer contains a release agent for diffusion toward the interior skin layer, and the release agent is present in the core layer in a quantity which is greater than the saturation capacity of peeling agent in the peelable layer for the release agent.

19 Claims, 1 Drawing Sheet

PEELABLE, NON-STICKY, HEAT-SEALABLE FILM FOR PACKAGING FATTY AND PASTY FOODS

FIELD OF THE INVENTION

The present invention generally relates to films for packing fatty or pasty foods such as cheese.

BACKGROUND OF THE INVENTION

Heat-sealable films are widely used in packaging applications for consumer items such as snacks, bakery overwrapping, confectionary, etc. Heat-sealable films can be oriented polymeric films, such as biaxially oriented polypropylene (BOPP) films. Heat-sealable BOPP plastic films are known from, for example, U.S. Pat. Nos. 8,431,234; 5,489,454; 4,996,096; and US Pub. 2012/0258307. In heat-sealable food packaging, there is an outer layer which is intended to come in contact with the food and which is heat-sealable. The heat-sealing is typically carried out using a heat sources such as electrically-heated metal bars which are provided of a pneumatic or hydraulic closing system. Once the film has been folded onto itself to bring two edges of the covering layer in contact with one another, the film is clamped between heat-sealing bars, so that it can be submitted to the simultaneous action of temperature and pressure leading to welding of the edges and closure of the packaging.

The seal must have the characteristic of exhibiting a very high sealing strength so as to ensure a high integrity in the closure of the packaging. This high sealing strength of the weld, which ensures proper preservation of the contents during transport, storage, and display, unfortunately requires a correspondingly high force to separate the joined layers to open the package. So once the weld gives and the package opens, the force applied continues to be exerted on package walls. As a result, there is often uncontrolled breakage of the package, resulting in the packaging being opened more rapidly and/or being opened more completely than desired.

A number of prior patent publications such as U.S. Pat. No. 5,773,136 by Alder et. al.; U.S. Pat. No. 7,316,848 by Longmoore; US H1727 ('727) by Jones et al.; and EP 1810823 ('823) by Filippo et al. have proposed heat-sealable films which are also peelable. In these constructions, one layer of a multilayer film has a composition such that it can be peeled from the adjacent layer. That is, the peelable layer has a sealing strength with respect to its adjacent layer which is a lower sealing strength than that between two heat-sealed edges.

SUMMARY OF THE INVENTION

Briefly, therefore, the invention is directed to a heat-sealable polymer-based multilayer film for peelably and releasably packaging pasty or fatty foods wherein the film has (1) a polymer-based core layer having a food-facing side and an exterior-facing side, (2) a peelable layer on the food-facing side of the core layer, the peelable layer having a food-facing side and a core-facing side, and the peelable layer containing a peeling agent; and (3) an interior skin layer on the food-facing side of the peelable layer, the interior skin layer having a food-facing side and a core-facing side; wherein the core layer contains a release agent for diffusion toward the interior skin layer; wherein the peeling agent in the peelable layer has a saturation capacity for the release agent and the release agent is present in the core layer in a quantity which is greater than said saturation capacity.

Other objects and features will be in part apparent and in part pointed out hereinafter.

DESCRIPTION OF THE EMBODIMENT(S) OF THE INVENTION

Figure 1:
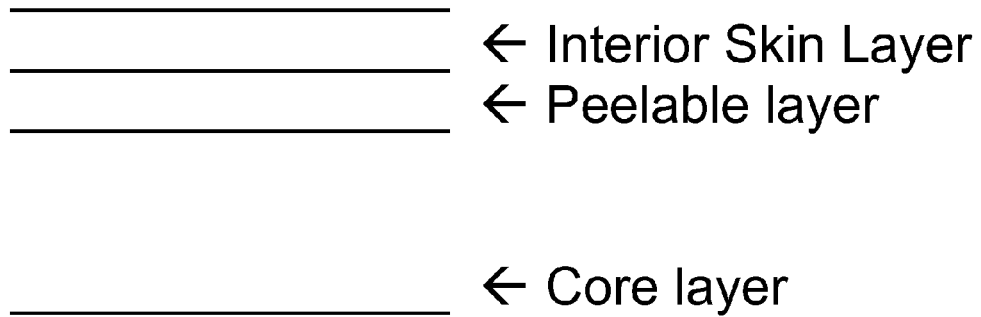
FIG. 1 is a schematic illustration of a first embodiment of the film of the invention.

The present invention is directed to a heat-sealable polymer-based multilayer film for peelably and releasably packaging pasty or fatty foods. The multilayer film has at least three layers, and may have four, five, or more layers. The required layers are a core layer, a peelable layer, and an interior skin layer, a depicted schematically in FIG. 1. The interior skin layer is the layer which contacts the food being packaged. The core layer is typically the thickest layer and is the primary structural support and strength for the multilayer film. The peelable layer is between the core layer and the interior skin layer, and imparts the peelable properties to the film. The polymer-based core layer has a food-facing side and an exterior-facing side, with the peelable layer being on the food-facing side of the core layer. The peelable layer has a food-facing side and a core-facing side, with the interior skin layer on the food-facing side of the peelable layer, and the interior skin layer having a food-facing side and a core-facing side.

It is known to include release agent in the composition of the interior skin layer to provide the interior skin layer properties of release from pasty and/or fatty foods such as cheese. This release agent is generally relatively rapidly consumed and/or released during the film forming process, the package forming process, the food packing process, and over time during the food storage process. The release properties therefore deteriorate over time. Applicants' films therefore include release agent in the core layer which release agent will slowly over time migrate to the interior skin layer to continually impart release properties thereto.

The inventors have discovered that constructing a multilayer film that has both release properties for releasing from fatty and pasty foods and peel properties for simplified opening is problematic because the peeling agents in the peelable layer of multilayer peelable films have a saturation capacity for release agents in multilayer films. Accordingly, the inventors have discovered that it is advantageous to formulate such films taking this into account. These films therefore have their release agent present in the core layer in a quantity which is greater than the saturation capacity of the peeling agent for the release agent. This ensures that there is excess release agent to provide release properties to the interior skin layer. In one preferred embodiment, the concentration of release agent in the core layer is determined as a function of the thickness of the core layer, the thickness of the peelable layer, and the concentration of peeling agent in the peelable layer. In one such embodiment, the concentration ($R_c$) of release agent in the core layer is greater than $0.5 \times T_p \times (P_p/T_c)$, wherein $T_p$ is the thickness of the peelable layer, $P_p$ is the concentration of peeling agent in the peelable layer, and $T_c$ is the thickness of the core layer. For example, if the peelable layer is 1 μm thick and contains 30% (300,000 ppm) of release agent, and the core layer is 19 μm thick, then the loading of release agent is at least 7895 ppm: 0.5×1×(300,000/19)=7895. Applicants have discovered that they can ensure long-term release properties by loading release agent into the core in an amount that is greater than the saturation capacity of the peeling agent in the peelable layer for the release agent, preferably in an amount at least as great as 0.5×Tp×(Pp/Tc). The goal is to provide release agent in the core in a concentration and quantity which satisfies the saturation capacity that the peeling agent has for release agent, and which provides sufficient excess release agent to continually supply release agent to the interior skin layer.

As a general proposition, materials that are diffusable between plastic layers migrate from areas of higher concentration to areas of lower concentration. That is, if there is a concentration gradient of 10% of compound X in layer 1 and 30% of compound X in layer 2, compound X will migrate to layer 1 only until such time as a concentration equilibrium is reached, and both layers have, e.g., 20% of compound X. As a corollary, if the concentration compound X in layer 1 is greater than the concentration of compound X in layer 2, then there would be no migration of compound X from layer 2 to layer 1. In the present situation, however, it is believed that a large portion of release agent in the peelable layer is fixed by the peelable agent and only a small portion of release agent is mobile. The total release agent concentration including fixed and mobile in the peelable layer may be greater than the release agent concentration in the core layer; but the mobile release agent concentration is lower. So, due to the differences in mobile release agent concentration, release agent continues to migrate from the core layer through the peelable layer to the skin layer, even though the overall release agent concentration in the peelable layer is greater and would indicate that migration should stop or even reverse.

In some preferred embodiments, the loading of release agent in the core layer is less than 1.5×Tp×(Pp/Tc). Using more release agent than this upper limit is avoided to avoid problems of sealability, printability, and the release agent interfering with film processing, which can result in, e.g., die dripping, smoke, discontinuity of web, etc. In one embodiment, therefore, the loading of release agent in the core layer is at least about 0.5×Tp×(Pp/Tc), such as about 0.53×Tp×(Pp/Tc) or at least 0.53×Tp×(Pp/Tc). In another embodiment, the loading of release agent in the core layer is at least about 0.7×Tp×(Pp/Tc), such as about 0.75×Tp×(Pp/Tc) or at least about 0.75×Tp×(Pp/Tc). In certain embodiments the loading of release agent in the core layer is less than about 1.5×Tp×(Pp/Tc), such as less than about 1.0×Tp×(Pp/Tc) or, for example, no more than about 0.8×Tp×(Pp/Tc) or no more than about 0.75×Tp×(Pp/Tc).

The core layer is typically the thickest layer and is the primary structural support and strength for the multilayer film. Its primary function is to provide the film its high mechanical properties like stiffness, modulus and tensile, provide some barrier to water vapor transmission and be the major layer in proportion to support the other layers. The thickness of the core layer is, for example, between about 10 and about 80 μm, for example between about 15 and about 40 μm.

The core layer is a polymer-based layer which comprises at least about 50 wt % polymer, such as at least about 90 wt % of a polymer. In one embodiment, core layer has at least about 90 wt % of a homopolymer of polypropylene. In one such embodiment this homopolymer is homopolymer polypropylene having a melt flow index (MFI) between 1.2 to 3.0 g/10 minutes preferable 1.6 to 2.4 g/10 min. An antistatic agent such as an amine may be optionally included. For example, there may be between about 50 and about 500 ppm of an amine as an antistatic agent, such as about 150 ppm. A slip agent may also be included. A slip additive is a plastics modifier that acts as a lubricant by exuding to the surface of the plastic during and immediately after processing to reduce friction between layers of film. Lower friction facilitates handling of the film and other surfaces, e.g., rollers, to which the film comes into contact. Slip additives are generally fatty materials, such as, for example, long chain fatty acids, alcohols, and amides. Preferred slip additives are fatty amides having carbon chains generally ranging from 14 to 22 carbon atoms, such as from 15 to 19 carbon atoms, including oleamide and stearic amide. For example, core layer may include between about 150 and 500 ppm of an amide as a slip agent, such as about 250 ppm. Accordingly, in one embodiment the core layer comprises more than 90 wt % homopolymer PP, between about 50 and 500 ppm of an antistatic agent, and between about 150 and 500 ppm of a slip agent. In one such embodiment, the 99+ wt % balance of the core layer is homopolymer PP other than the antistatic and slip agent.

The core layer also contains a quantity of release agent to over time provide release agent which migrates and diffuses through the peelable layer to the interior skin layer to provide continual release properties to the interior skin layer. This way, the interior skin layer will have good properties of release from pasty and fatty foods such as cheese for weeks and months after packaging. Release agents are known in the art and the specific release agent selected for use in the films of the invention is not narrowly critical. In one embodiment, the release agent is a polyol ester such as, for example, a polyol ester having a carbon chain length from about C12 to about C4, such as a compound selected from the group consisting of glycerol monostearate, glycerol monobehenate, glycerol monooleate, and combinations thereof. The concentration of release agent in the core layer in accordance with certain embodiments of the present invention is at least about 3000 such as between about 3000 and 15,000 ppm; such as at least about 5000, at least about 5500, at least about 6000, or at least about 7000. In one embodiment, it is between about 5500 and about 10,000. In addition, the concentration of release agent in the core layer in some preferred embodiments is determined as a function of the as a function of the thickness of the core layer, the thickness of the peelable layer, and the concentration of peeling agent in the peelable layer, as described above.

The peelable layer is, for example, a blend of a propylene polymer and an ethylene polymer. The propylene polymer in one embodiment is a polypropylene homopolymer or a copolymer of propylene and ethylene having a low ethylene content such as not more than 2 wt % or not more than 1 wt %, in polymerized propylene. The propylene polymer preferably has a high isotactic content, such as greater than 95 weight percent. The ethylene polymer is in one embodiment a copolymer of ethylene with at least one alpha-olefin, for example copolymers of ethylene with propylene, butene-1 or 4-methylpentene-1.

The peelable layer comprises a peeling agent, which agents are known in the art. The specific peeling agent selected for use in the films of the invention is not narrowly critical. In one embodiment, the peeling agent is an ethylene copolymer such as, for example, a compound selected from the group consisting of ethlyene acrylic acid, ethylene methacrylate, and ethylene ethyl acrylate, and combinations thereof. Suitable peeling agents include ethylene acrylic acid copolymer available from Dow under the family name of Primacor and polypropylene-modified ethylene methacrylate available from DuPont under the family name of Appeel. The concentration of peeling agent in the peelable layer is typically between about 1 and about 80%, such as between about 5 and about 50%. In the currently preferred embodiment, peeling agent concentration is selected to achieve an initial peak peel strength of less than 450 g/inch and a subsequent continuous peel strength of less than 250 g/inch.

In the currently preferred embodiment, the peelable layer is formulated to contain no release agent. That is, the peelable layer is formed from a blend which contains no release agent. Over time, release agent from the core layer diffuses into the peelable layer, and through the peelable layer into the interior skin layer.

The thickness of the peelable layer is, for example, between about 0.25 and about 6 µm, for example between about 0.5 and about 3 µm.

The interior skin layer is a heat-sealable composition of any of a variety of heat sealable polymers known in the art. Typically, the heat sealable polymer is selected from olefin copolymers, and more particularly from copolymers containing units derived from at least two of ethylene, propylene and butene-1. Particularly preferred heat sealable polymers for the interior skin layer are propylene-ethylene copolymers and/or ethylene-propylene-butene-1 terpolymers and/or propylene-butene-1 copolymers with at least 50 wt % propylene in the copolymers and terpolymers. One suitable example comprises 2 wt % ethylene, 88 wt % propylene, and 10 wt % butene-1. Another example of a suitable interior skin layer is a layer which contains 20%-45% matte resin, 15-25% propylene/ethylene copolymer, 15-25% propylene/butylene copolymer and 15-35% GMS concentrate and is formulated to impart a low heat seal initiation temperature. The interior skin layer has a thickness of, for example, between about 0.25 and about 6 µm, for example between about 0.5 and about 3 µm.

Figure 2:
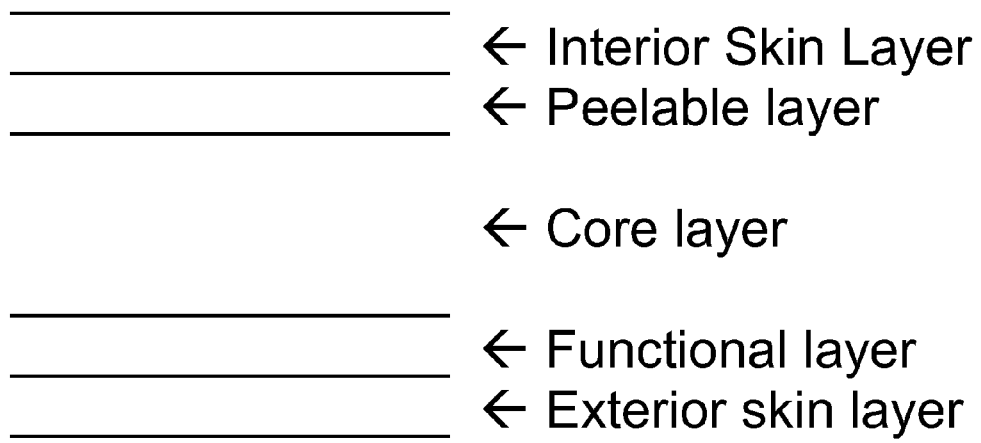
FIG. 2 is a schematic illustration of a second embodiment of the film of the invention.

FIG. 1 illustrates the basic three layers of all embodiments of the invention. The multilayer films of the invention include multilayers of three, four, five, or more layers. FIG. 2 illustrates an embodiment with five layers. In this embodiment, there is an optional functional layer on the exterior-facing side of the core layer. A functional layer contains, for example, a hydrocarbon resin such as is available from Exxon Mobil under the name Oppera. An example of such a layer is formed from a blend of between of about 10 and about 80 wt % 15 and 60%.

The exterior skin layer in the embodiment shown in FIG. 2 comprises, for example, a printable layer, as this layer typically forms the package exterior.

The compositions of the layers are described herein as containing various components by weight %. However, those skilled in the art understand that in a layer of the ultimate film, the specific compounds such as the polypropylene and propylene-butene copolymer may not be separately identifiable or even necessarily separately present. Nonetheless, it is conventional in the art to refer to the final composition as containing a given % of the individual components that go into forming the film; so that is done here. From this perspective, the compositions herein are on an equivalent basis.

The multiple layers films are produced by co-extrusion of the multiple layers by conventional methods as are well understood in the art. During the forming process in one embodiment, the films are stretched in both the machine direction and cross direction to impart BOPP film properties. This should be sufficient for one skilled in the art of BOPP.

The invention is also applicable to film stretched in one direction and unstretched film.

EXAMPLE 1

A peelable cheese film was prepared with an interior skin layer, peelable layer, and core layer having thicknesses of 1.0, 1.0 and 19 µm, respectively. On the other side of the core layer there were a functional layer of polypropylene and additives, and an exterior skin layer of a polyolefin of low seal initiation temperature and additives, as generally depicted in FIG. 2, each having a thickness of about 1 µm. The interior skin layer had 30,000 ppm GMS release agent blended into an ethylene-propylene-butene-1 terpolymer comprising 2 wt % ethylene, 88 wt % propylene, and 10 wt % butene-1. The peelable layer was polypropylene homopolymer with a loading of peeling agent EAA of 30%. The core layer was polypropylene homopolymer with a GMS loading of 6000 ppm. There was no release agent GMS in the peelable layer. The release properties were not satisfactory.

EXAMPLE 2

A second peelable cheese film was formed with an interior skin layer, peelable layer, and core layer having thicknesses of 0.7, 1.0 and 18.8 µm. The loading of peeling agent EEA in the peelable layer was reduced to 20%, with a balance of polypropylene homopolymer. On the other side of the core layer there were a functional layer of polypropylene and additives of 1 µm thickness, and an exterior skin layer of a polyolefin of low seal initiation temperature and additives of 1.5 µm, as generally depicted in FIG. 2. The loadings of release agent GMS in the skin layer and core layer were 45,000 and 8,000 ppm, respectively. Otherwise, the materials were the same as in Example 1. The release agent loading (Rc) in core layer fell within the range of 5,300-16,000 ppm according to the equation $0.5 \times Tp \times (Pp/Tc) < Rc < 1.5 \times Tp \times (Pp/Tc)$ for this sample. The release properties were satisfactory. In contrast, the loading Rc of release agent in the core layer for the film of Example 1 was less than $0.5 \times Tp \times (Pp/Tc)$.

EXAMPLE 3

A third film (XE-449) was formed with an interior skin layer, peelable layer, and core layer having thicknesses of 0.7, 0.7 and 19.6 µm. The loading of peeling agent EEA in the peelable layer was 30% (with a balance of propylene homopolymer) and the thickness of the peelable layer was lower (0.7 µm). On the other side of the core layer there were a functional layer of polypropylene and additives, and an exterior skin layer of a polyolefin of low seal initiation temperature and additives, as generally depicted in FIG. 2. The release agent GMS loadings in the skin layer and core layer were 45,000 and 8,000 ppm, respectively. Otherwise, the materials were the same as in Example 1. The release agent GMS loading in the core layer was within the range of 5,380-15,800 ppm per the equation in item 1. The release properties were satisfactory.

As shown in Table 1, the release properties were not satisfactory when the concentration of release agent in the core layer was not greater than $0.5 \times Tp \times (Pp/Tc)$, and was not in the range between as $0.5 \times Tp \times (Pp/Tc)$ and $1.5 \times Tp \times (Pp/Tc)$.

TABLE 1

| Film | Ex. 1 | Ex. 2 | Ex. 3 |
| --- | --- | --- | --- |
| Thickness of Film, um | 23 | 23 | 23 |
| Thickness of Layer A, um | 1 | 0.7 | 0.7 |
| Thickness of Layer B, um | 1 | 1 | 0.7 |
| Thickness of Layer C, um | 19 | 18.8 | 19.9 |
| GMS Loading in Layer A, ppm | 30,000 | 45,000 | 45,000 |
| GMS Loading in Layer B, ppm | 0 | 0 | 0 |
| GMS Loading in Layer C, ppm | 6,000 | 8,000 | 8,000 |
| EEA Loading in B, % | 30% | 20% | 30% |
| Cheese Release Property | Not Satisfactory | Satisfactory | Satisfactory |
| 0.5*Lb*Pb/Lc, ppm | 7,895 | 5,319 | 5,276 |
| 1.5*Lb*Pb/Lc, ppm | 23,684 | 15,957 | 15,829 |

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above products and methods without departing from the scope of the invention, it is intended that all matter contained in the above description shall be interpreted as illustrative and not in a limiting sense.

What is claimed is:

1. A heat-sealable polymer-based multilayer film for peelably and releasably packaging pasty or fatty foods comprising:
  a polymer-based core layer having a food-facing side and an exterior-facing side;
  a peelable layer on the food-facing side of the core layer, the peelable layer having a food-facing side and a core-facing side, and the peelable layer containing a peeling agent; and
  an interior skin layer on the food-facing side of the peelable layer, the interior skin layer having a food-facing side and a core-facing side;
  wherein the core layer contains a release agent for diffusion toward the interior skin layer;
  wherein the peeling agent in the peelable layer has a saturation capacity for the release agent and the release agent is present in the core layer in a quantity which is greater than said saturation capacity; and
  wherein the core layer contains the release agent in a concentration ($P_c$) which is greater than $0.5 \times T_p \times (P_p/T_c)$, wherein $T_p$ is the thickness of the peelable layer, $P_p$ is the concentration of peeling agent in the peelable layer, and $T_c$ is the thickness of the core layer.

2. The multilayer film of claim 1 wherein the release agent is a polyol ester and the peeling agent is an ethylene copolymer.

3. The multilayer film of claim 1 wherein a concentration of release agent in the core layer is determined as a function of the thickness of the core layer, the thickness of the peelable layer, and the concentration of peeling agent in the peelable layer.

4. The multilayer film of claim 1 wherein the concentration ($P_c$) of release agent in the core layer is less than $1.5 \times T_p \times (P_p/T_c)$.

5. The multilayer film of claim 2 wherein the release agent polyol ester is selected from the group consisting of glycerol monostearate, glycerol monobehenate, and glycerol monooleate.

6. The multilayer film of claim 2 wherein the peeling agent ethylene copolymer is selected from the group consisting of ethylene acrylic acid copolymer, ethylene methacrylate, and ethylene ethyl acrylate.

7. The multilayer film of claim 1 wherein the thickness of the core layer is between about 10 and about 80 μm.

8. The multilayer film of claim 7 wherein the thickness of the core layer is between about 15 and about 40 μm.

9. The multilayer film of claim 1 wherein the thickness of the peelable layer is between about 0.25 and about 6 μm.

10. The multilayer film of claim 7 wherein the thickness of the peelable layer is between about 0.5 and about 3 μm.

11. The multilayer film of claim 1 wherein the thickness of the interior skin layer is between about 0.25 and about 6 μm.

12. The multilayer film of claim 1 wherein:
  the concentration ($P_c$) of release agent in the core layer is less than $1.5 \times T_p \times (P_p/T_c)$;
  the release agent is a polyol ester;
  the peeling agent is an ethylene copolymer;
  the thickness of the core layer is between about 10 and about 80 μm;
  the thickness of the peelable layer is between about 0.25 and about 6 μm; and
  the thickness of the interior skin layer is between about 0.25 and about 6 μm.

13. The multilayer film of claim 1 wherein the film further comprises:
  an exterior skin layer on the exterior-facing side of the core layer.

14. The multilayer film of claim 1 wherein the film further comprises:
  an oxygen barrier layer on the exterior-facing side of the core layer.

15. The multilayer film of claim 1 wherein the film is a biaxially oriented polypropylene (BOPP) film.

16. The multilayer film of claim 1 wherein the interior skin layer has a low seal initiation temperature.

17. The multilayer film of claim 13 wherein the exterior skin layer has a low seal initiation temperature.

18. The multilayer film of claim 1 wherein the interior skin layer has matte appearance.

19. The multilayer film of claim 1 wherein the exterior skin layer has matte appearance.

* * * * *